United States Patent [19]

Lentz et al.

[11] Patent Number: 4,552,270

[45] Date of Patent: Nov. 12, 1985

[54] STORAGE SYSTEM FOR ATHLETIC EQUIPMENT OR THE LIKE

[76] Inventors: Scott B. Lentz, 1000 N. Columbus St.; Howard C. Dale, 1013 Duke St., both of Alexandria, Va. 22314

[21] Appl. No.: 585,192

[22] Filed: Mar. 1, 1984

[51] Int. Cl.[4] .................................................. A47F 7/00
[52] U.S. Cl. ........................................ 211/17; 211/22; 211/190; 211/208; 211/86
[58] Field of Search ...................... 211/17, 86, 18, 20, 211/22, 19, 187, 207, 208, 190, 189; 182/200, 107

[56] References Cited

U.S. PATENT DOCUMENTS

| 864,044 | 8/1907 | Thomson | 182/200 |
|---|---|---|---|
| 2,439,049 | 4/1948 | Lesko . | |
| 2,855,037 | 10/1958 | Stiffel . | |
| 2,903,227 | 9/1959 | Key . | |
| 3,302,799 | 2/1967 | Blodu | 211/86 |
| 3,527,354 | 9/1970 | Sokolow | 211/60 SK |
| 3,797,671 | 3/1974 | Sebilleau et al. . | |
| 3,948,581 | 4/1976 | Helmon et al. | 211/86 X |
| 3,976,200 | 8/1976 | Munns | 211/18 |
| 4,116,341 | 9/1978 | Helsda | 211/17 |
| 4,354,604 | 10/1982 | Isaacs . | |

FOREIGN PATENT DOCUMENTS

| 1371949 | 8/1964 | France | 211/86 |
|---|---|---|---|
| 939623 | 10/1963 | United Kingdom | 211/86 |

Primary Examiner—Robert W. Gibson, Jr.
Attorney, Agent, or Firm—Parkhurst & Oliff

[57] ABSTRACT

A storage system for holding athletic equipment, and particularly for holding bicycles. The storage system includes two vertically adjustable longitudinal support members attached by cross support pieces. The storage system may be disposed between two substantially horizontal surfaces, such as a floor and a ceiling. A mechanism for fine adjustment of the height of the storage system is provided to achieve a tight fit of the storage system between the floor and ceiling and to compensate for non-parallelism therebetween.

9 Claims, 6 Drawing Figures

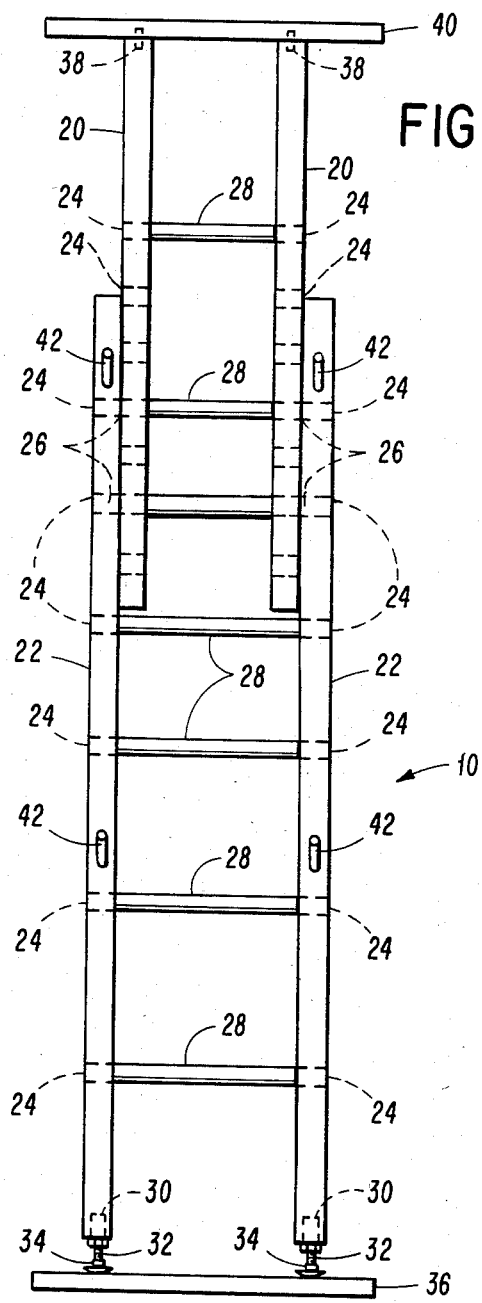
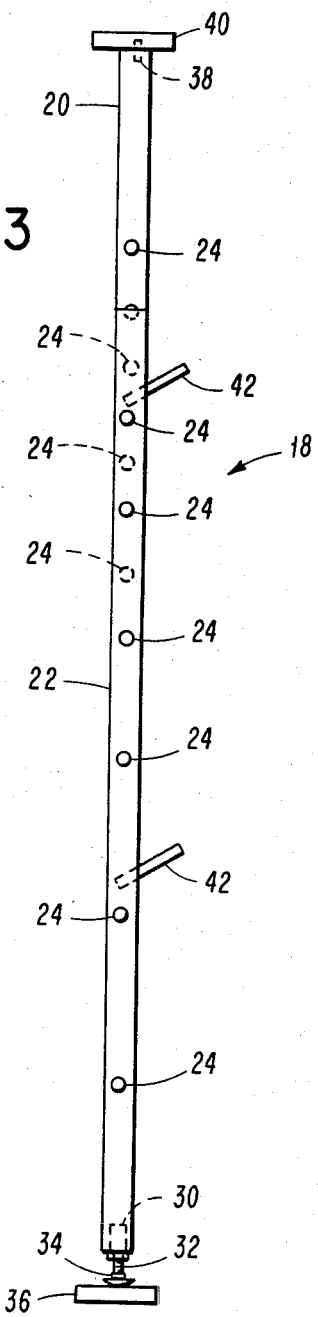
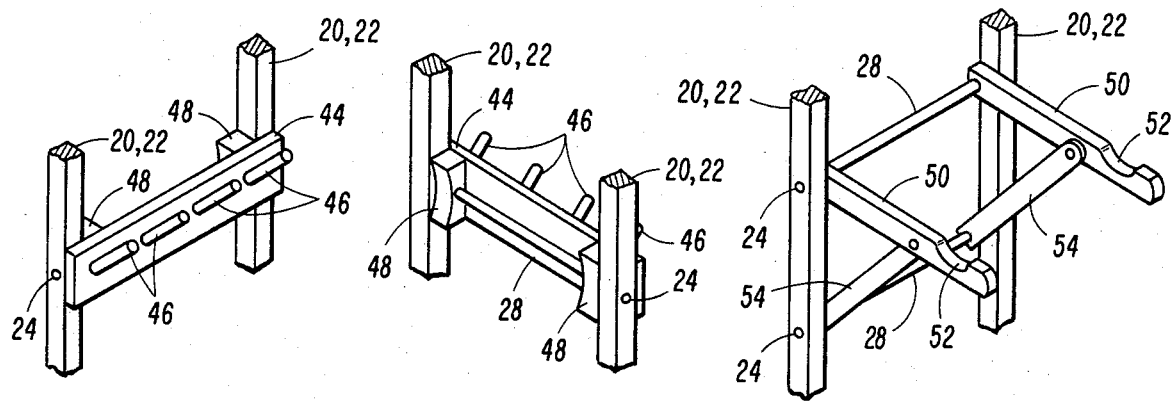
FIG 2 FIG 3 FIG 4 FIG 5 FIG 6

STORAGE SYSTEM FOR ATHLETIC EQUIPMENT OR THE LIKE

BACKGROUND ON THE INVENTION

The present invention relates to a system for the storage of athelitic equipment including bicycles, tennis rackets, surf boards and other miscellaneous items such as helmets, tennis balls or surfing wax.

It is well known in the art to provide poles or rods adapted to be supported between spaced surfaces or to lean against a vertical surface to provide a means of supporting articles for display or storage as represented by U.S. Pat. No. 2,903,227, U.S. Pat. No. 2,439,049 and U.S. Pat. No. 2,855,037. However, these structures do not have the requisite durability or stability to support relatively heavy articles such as bicycles or surf boards. Furthermore, many of these structures do not afford a wide range of vertical adjustability so as to be capable of use in areas of significantly different vertical heights.

SUMMARY OF THE INVENTION

The present invention is directed to a storage system that avoids the above-mentioned disadvantages which are characteristic of the prior art. More specifically, the storage system of this invention is a floor to ceiling rack for mounting bicycles and other sports equipment within the home, apartment or condominium. The rack contains no permanent hardware and thus may easily be assembled and disassembled while leaving floors and ceilings unscarred.

The storage system is formed from a pair of overlapping longitudinal support members adjustably positioned by cross support pieces. Each longitudinal support is formed from two members having a plurality of drillings therein. The cross support pieces extend through the drillings to connect the pair of longitudinal supports. The overall length of the longitudinal supports is adjustable by shifting the upper sections of each support so that the cross support pieces are aligned with different respective drillings in the shorter sections of the longitudinal supports. Fine adjustment is achieved by means of threaded feet members located in the bottom of each longitudinal support member. Supports, such as rods or posts, are provided at respective positions on each longitudinal support member so as to hold two triangular framed bicycles. Other support accessories for holding items such as surf boards or tennis rackets are provided. These support accessories are attached to the storage system by means of drillings through which the cross support pieces extend to connect the support accessory to the pair of longitudinal supports.

BRIEF DESCRIPTION OF THE DRAWINGS

In describing the invention, reference will be made to the accompanying drawings in which:

FIG. 2 is a front elevation of the storage system of FIG. 1;

FIG. 3 is a side elevation of the storage system of FIG. 1;

FIG. 4 is a perspective view of an additional equipment holder for use with the present invention;

FIG. 5 is another perspective view of the additional equipment holder shown in perspective in FIG. 4; and FIG. 6 is a perspective view of an additional support member for use with the present invention.

DETAILED DESCRIPTION OF THE INVENTION

Figure 1:
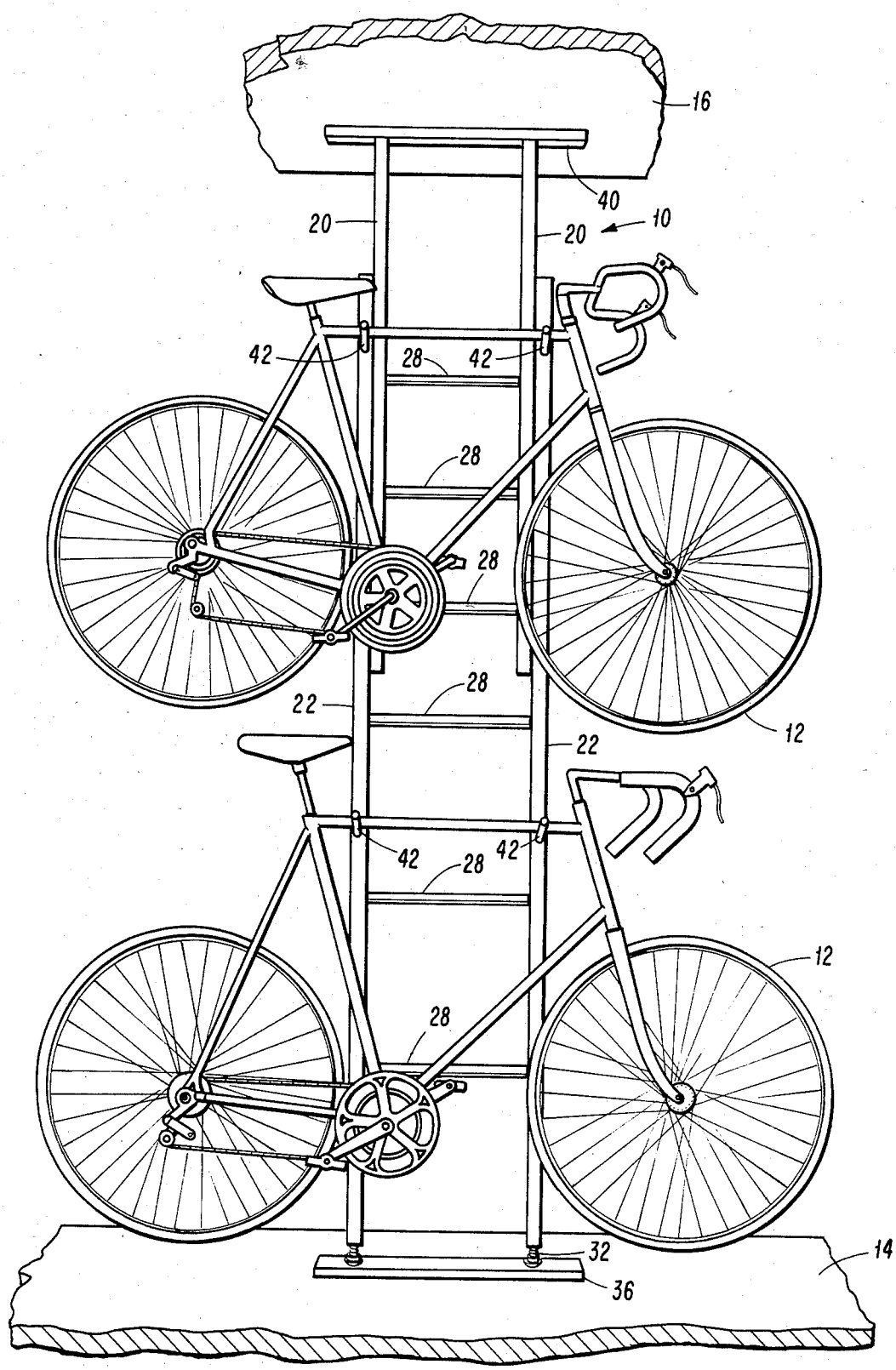
FIG. 1 is a perspective view of a storage system for bicycles and other athletic equipment embodying the present invention.

Referring now to the drawings, and in particular FIG. 1, a storage system generally indicated at 10 extends from a floor or other contacting surface 14 to a ceiling or other contacting surface 16. The storage system 10 holds two triangular framed bicycles 12.

Referring now to FIGS. 2 and 3, the storage system 10 has two longitudinal support members 18 which are composed of an upper section 20 and a lower section 22. The upper section 20 and the lower section 22 of each longitudinal support member 18 have a plurality of drillings 24 therein. A plurality of cross support pieces 28 extend through the drillings 24 to connect the pair of longitudinal support members 18. Certain drillings 24 in the upper section 20 and the lower section 22 define overlap regions 26 on each longitudinal support member 18. Cross support pieces pass through the overlap regions 26 to connect the upper 20 and lower 22 sections together. The drillings 24 in the upper section 20 are spaced closer together than the drillings 24 in the lower section 22. The overall length of the longitudinal support members 18 is adjusted by shifting the upper sections 20 of each support so that the respective overlap regions are redefined by a different correspondence between the drillings of the upper section and the lower section. Depending upon the length to which each longitudinal support member is adjusted, two or three overlap regions may be defined. When adjusted to a shortened position, as in FIG. 1, three cross-support members extend through overlap regions defined by corresponding drillings. Similarly, in a lengthened position, as in FIGS. 2 and 3, only two cross-support pieces extend through overlap regions. The number of drillings provided in each longitudinal support member, as well as the number of cross-support pieces and overlap regions, depend upon the overall maximum length desired for the storage system.

As shown in FIGS. 2 and 3, additional cross-support pieces may be added to the upper portion of the upper section 20. These additional cross suppport pieces provided additional support and rigidity.

A threaded foot member 32 engages a threaded nut 30 secured to the lower end of the lower section 22 of each longitudinal support member 18. A rounded lap 34 is disposed at the end of the threaded foot member 32 opposite the threads. The rounded lap 34 of each foot member is in contact with a horizontal contact member 36, the horizontal contact member 36 being in contact with a floor or other horizontal surface.

A locator peg 38 is provided at the upper end of the upper section 20 of each of the longitudinal support members 18. The locator pegs 38 of the longitudinal support members are secured to a horizontal contact member 40, the horizontal contact member 40 being in contact with a ceiling. The horizontal contact member 40 yields transverse stability of the storage system 10, thus preventing the storage system 10 from twisting or leaning.

As described above, the overall length of each of the longitudinal supports 18 is adjusted by shifting the upper section 20 thereof so that the cross support pieces 28 are aligned with redefined overlap regions 26. Fine height adjustment of the storage system 10 is achieved with the threaded feet members 32. The threaded feet 32 ensure that a tight fit between a floor and ceiling or any other two substantially horizontal surfaces is obtained by the horizontal contact members 36 and 40. Since the threaded feet members 32 may be adjusted independently of each other, a tight fit between a floor and ceiling may be obtained by the storage system 10 even where the two contacting surfaces between which the support system is disposed are not exactly parallel. The threaded feet members must have a range of adjustability corresponding to, at least, the distance between the drillings in the upper section 20. In this manner, a continuous range of adjustability of the longitudinal support member is achieved. Movement between the upper 20 and lower 22 sections achieves coarse length adjustment, wherein fine length adjustment is accomplished by independently adjusting the threaded feet members.

A plurality of rod supports 42 are fixedly connected to the longitudinal support members 18 and extend in an acute angle therefrom. The rod supports are connected to the longitudinal support members 18 in an axial relation so that the corresponding rod supports 42 of each longitudinal support member are the same height from the bottom of the storage system 10. The rod supports 42 advantageously support two triangular framed bicycles 12 as shown in FIG. 1.

In an alternative storage system (not shown in the figures), a weighted box is permanently attached to the lower end of a pair of longitudinal support members. The weighted box engages a floor or other horizontal contact surface and maintains the storage system in an upright position. A horizontal contact member is not provided at the upper end of the longitudinal support members. This embodiment of the invention is particularly suited for use in areas where the vertical distance between a lower horizontal surface and an upper horizontal surface is relatively large, or in areas having suspended ceilings, wherein the storage system could not be practically adapted to come into contact with an upper horizontal surface. The weighted box may be provided with an operable lid to advantageously store miscellaneous athletic equipment such as riding helmets, tennis balls and other accessories.

An additional equipment holder is illustrated in FIGS. 4 and 5. The additional equipment holder comprises a rod support piece 44 with a plurality of rod supports 46 permanently attached thereto. Blocks 48 having drillings therein are attached to the rod support piece 44. The blocks 48 are attached to the rod support piece 44 in such a way that the additional equipment holder fits in between either the upper section 20 or the lower section 22 of the longitudinal support members 18. A cross support piece 28 extends through the drilling in the blocks and attaches the equipment holder to the longitudinal support members 18. The rod supports 46 are fixedly attached to the rod support piece 44 at an acute angle therefrom and in an axial relation. The additional equipment holder is particularly suitable for holding tennis rackets or the like.

An additional support member is shown in FIG. 6. Horizontal support pieces 50 are provided, each having a drilling in one end and a groove 52 in an opposite end thereof. The horizontal support pieces are adapted to fit between the upper sections 20 or the lower sections 22 of the longitudinal support members 18. A cross support piece 28 passes through the drillings of the horizontal support pieces, thereby attaching the horizontal support pieces 50 to the longitudinal support members 18. Angular support pieces 54 are connected to the horizontal support pieces 50 between the drillings and the groove 52 by dowels or other suitable members. At the end of each angular support piece 54 opposite the attachment to the horizontal support piece 50 is cut a semicircular groove. The semicircular groove of each angular support piece 54 is adapted to releasably engage the cross support piece 28 which is immediately below the cross support piece to which the horizontal support pieces 50 are attached. The equipment holder of this embodiment is particularly suited for holding surf boards or the like.

While preferred embodiments of the invention have been shown and described, it will be understood by persons skilled in this art that various changes and modifications may be made without departing from the spirit of the inventin which is defined by the following claims.

What is claimed is:

1. A storage system for holding athletic equipment and the like, comprising:
    (a) first and second longitudinal support members, each of said longitudinal support members comprising an upper and a lower longitudinally adjustable section, said upper longitudinally adjustable section having a first set of drillings formed therein, said lower longitudinally adjustable section having a second set of drillings formed therein, wherein at least two of said drillings of said first set overlap with at least two of said drillings of said second set to define a number of overlap regions exactly corresponding to the number of drillings in said first and second sets which overlap;
    (b) a plurality of cross support pieces extending from the first and second set of drillings in said first longitudinal support member to said first and second drillings of said second longitudinal support member, at least two of said plurality of cross support pieces extending through respective overlap regions of said first and second longitudinal support members;
    (c) means for adjustment operatively connected with a first end of each of said first and second longitudinal support members;
    (d) a first substantially horizontal contact member in engagement with said means for adjustment and adapted for contact with a first contacting surface;
    (e) a second substantially horizontal contact member in engagement with a second end of said first and second longitudinal support members and adapted for contact with a second contacting surface;
    (f) a plurality of support means connected to each of said first and second longitudinal support members;
    whereby coarse length adjustment of said first and second longitudinal support members is achieved by moving said upper and lower longitudinally adjustable sections relative to one another to thereby redefine the overlap regions, and fine length adjustment, as well as adjustment for nonparallelism of said first and second contacting surfaces, are achieved by said means for adjustment.

2. A storage system as in claim 1, wherein said cross support pieces have a cylindrical configuration.

3. A storage system as in claim 1, wherein said means for adjustment comprises:
    (i) a threaded nut permanently attached to the first end of each of the first and second longitudinal support members;

(ii) a threaded foot member on each of said first and second longitudinal support members, each said threaded foot member having a rounded lap at a first end and threads at a second end, said threads of each foot member engaging said threads of each threaded nut.

4. A storage system as in claim 1, wherein a locator peg is provided at the second end of each of said first and second longitudinal support members, said locator peg removably connecting the second substantially horizontal contact member to said first and second longitudinal support members.

5. A storage system as in claim 1, wherein said support means are fixedly connected to the first and second longitudinal support members, said support means extending in an acute angle therefrom.

6. A storage system as in claim 5, wherein said support means have a cylindrical configuration.

7. A storage system for holding athletic equipment and the like, comprising:
   first and second longitudinal support members, each said longitudinal support members having coarse adjustment means, said coarse adjustment means for simultaneously adjusting the length of both said longitudinal support members;
   cross support means rigidly interconnecting said first and second longitudinal support members;
   fine adjustment means operatively connected with a first end of each said first and second longitudinal support members;
   a first substantially horizontal contact member in engagement with said fine adjustment means and adapted for contact with a first contacting surface;
   a second substantially horizontal contact member in engagemenet with a second end of said first and second longitudinal support members and adapted for contact with a second contacting surface; and
   support means attached to said storage system.

8. A storage system for holding athletic equipment and the like, comprising:
   (a) first and second longitudinal support members, each of said longitudinal support members comprising an upper and a lower longitudinally adjustable section, said upper longitudinally adjustable section having a first set of drillings formed therein, said lower longitudinally adjustable section having a second set of drillings formed therein, wherein at least two of said drillings of said first set overlap with at least two of said drillings of said second set to define a number of overlap regions exactly corresponding to the number of drillings in said first and second sets which overlap;
   (b) a plurality of cross support pieces extending from the first and second set of drillings in said first longitudinal support member to said first and second drillings of said second longitudinal support member, at least two of said plurality of cross support pieces extending through respective overlap regions of said first and second longitudinal support members;
   (c) means for adjustment operatively connected with a first end of each of said first and second longitudinal support members;
   (d) a first substantially horizontal contact member in engagement with said means for adjustment and adapted for contact with a first contacting surface;
   (e) a second substantially horizontal contact member in engagement with a second end of said first and second longitudinal support members and adapted for contact with a second contacting surface;
   (f) support means connected to each of said first and second longitudinal support members, said support means comprising,
   (i) a rod support piece, said rod support piece having a plurality of rod supports fixedly connected thereto at an acute angle;
   (ii) first and second blocks, each having a drilling therein, said first and second blocks being connected to said rod support piece such that one of said cross support pieces passes therethrough to connect said blocks and rod support piece to said first and second longitudinal support members;
   whereby coarse length adjustment of said first and second longitudinal support members is achieved by moving said upper and lower longitudinally adjustable sections relative to one another to thereby redefine the overlap regions, and fine length adjustment, as well as adjustment for non-parallelism of said first and second contacting surfaces, are achieved by said means for adjustment.

9. A storage system for holding athletic equipment and the like, comprising:
   (a) first and second longitudinal support members, each of said longitudinal support members comprising an upper and a lower longitudinally adjustable section, said upper longitudinally adjustable section having a first set of drillings formed therein, said lower longitudinally adjustable section having a second set of drillings formed therein, wherein at least two of said drillings of said first set overlap with at least two of said drillings of said second set to define a number of overlap regions exactly corresponding to the number of drillings in said first and second sets which overlap;
   (b) a plurality of cross support pieces extending from the first and second set of drillings in said first longitudinal support member to said first and second drillings of said second longitudinal support member, at least two of said plurality of cross support pieces extending through respective overlap regions of said first and second longitudinal support members;
   (c) means for adjustment operatively connected with a first end of each of said first and second longitudinal support members;
   (d) a first substantially horizontal contact member in engagement with said means for adjustment and adapted for contact with a first contacting surface;
   (e) a second substantially horizontal contact member in engagement with a second end of said first and second longitudinal support members and adapted for contact with a second contacting surface;
   (f) support means connected to each of said first and second longitudinal support members, said support means comprising:
   (i) first and second horizontal support pieces, each having a drilling therein, such that one of said plurality of cross support pieces passes therethrough to connect said first and second horizontal support pieces to said first and second longitudinal support members;
   (ii) first and second angular support pieces respectively connected at ends thereof to said first and second support pieces, each of said first and second angular support pieces having a notch at another end thereof for engaging a cross support piece other than the cross support piece passing through said first and second horizontal support pieces;

whereby coarse length adjustment of said first and second longitudinal support members is achieved by moving said upper and lower longitudinally adjustable sections relative to one another to thereby redefine the overlap regions, and fine length adjustment, as well as adjustment for non-parallelism of said first and second contacting surfaces, are achieved by said means for adjustment.

* * * * *